(12) United States Patent
Kuhn et al.

(10) Patent No.: US 7,812,282 B2
(45) Date of Patent: Oct. 12, 2010

(54) METHODS OF FORMING FAN-SHAPED EFFUSION HOLES IN COMBUSTORS

(75) Inventors: Terrel E. Kuhn, Mesa, AZ (US); Sossity A. Flamand, Phoenix, AZ (US); Gregory O. Woodcock, Mesa, AZ (US); Rodolphe Dudebout, Phoenix, AZ (US); Lowell Frye, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 529 days.

(21) Appl. No.: 11/835,137

(22) Filed: Aug. 7, 2007

(65) Prior Publication Data
US 2008/0223835 A1    Sep. 18, 2008

Related U.S. Application Data

(60) Provisional application No. 60/895,027, filed on Mar. 15, 2007.

(51) Int. Cl.
*B23K 26/38*    (2006.01)
(52) U.S. Cl. .................................................. 219/121.71
(58) Field of Classification Search ............. 219/121.7, 219/121.71
See application file for complete search history.

(56) References Cited

U.S. PATENT DOCUMENTS

| | | | |
|---|---|---|---|
| 5,223,692 A | 6/1993 | Lozier et al. | |
| 5,609,779 A | 3/1997 | Crow et al. | |
| 5,683,600 A | 11/1997 | Kelley et al. | |
| 5,826,431 A * | 10/1998 | Makino et al. | ............... 60/757 |
| 5,837,964 A | 11/1998 | Emer et al. | |
| 6,130,405 A * | 10/2000 | Loringer | ............. 219/121.71 |
| 6,307,175 B1 | 10/2001 | Blochlinger et al. | |
| 6,329,015 B1 * | 12/2001 | Fehrenbach et al. | ......... 427/142 |
| 6,329,632 B1 | 12/2001 | Fournier et al. | |
| 6,362,446 B1 | 3/2002 | Jones et al. | |
| 6,420,677 B1 | 7/2002 | Emer et al. | |
| 6,518,543 B1 | 2/2003 | Benz et al. | |
| 6,627,844 B2 | 9/2003 | Liu et al. | |

(Continued)

FOREIGN PATENT DOCUMENTS

GB    2389330 A    * 12/2003

(Continued)

*Primary Examiner*—Geoffrey S Evans
(74) *Attorney, Agent, or Firm*—Ingrassia Fisher & Lorenz, P.C.

(57) ABSTRACT

Methods are provided of forming a plurality of fan-shaped effusion holes on a combustor having a surface, each hole having an outlet on the combustor surface. The method may include rotating the combustor relative to a laser beam, and positioning the combustor to a first position where the laser beam is at a first predetermined angle relative to the combustor surface. The laser beam is pulsed at the combustor surface to form a first plurality of trepan cuts. The first predetermined angle is adjusted to a second position where the laser beam is at a second predetermined angle relative to the combustor surface. The laser beam is pulsed at each trepan cut of the first plurality of trepan cuts, to thereby form a cut for at least a portion of the fan shape of each effusion hole outlet, wherein each cut overlaps a trepan cut of the first plurality of trepan cuts.

19 Claims, 5 Drawing Sheets

U.S. PATENT DOCUMENTS

| | | |
|---|---|---|
| 6,706,996 B2 | 3/2004 | Wybrow et al. |
| 6,734,390 B1 * | 5/2004 | Frye ........................ 219/121.7 |
| 6,744,010 B1 * | 6/2004 | Pepe et al. ............. 219/121.71 |
| 6,914,214 B2 | 7/2005 | Byrd et al. |
| 7,019,257 B2 | 3/2006 | Stevens |
| 7,193,175 B1 | 3/2007 | Chang et al. |
| 2003/0213250 A1 * | 11/2003 | Pacheco-Tougas et al. .... 60/752 |
| 2006/0037323 A1 * | 2/2006 | Reynolds et al. .............. 60/754 |

FOREIGN PATENT DOCUMENTS

JP      2006-307842 A   * 11/2006

* cited by examiner

METHODS OF FORMING FAN-SHAPED EFFUSION HOLES IN COMBUSTORS

CROSS-REFERENCES TO RELATED APPLICATIONS

This application claims the benefit of U.S. Provisional Application No. 60/895,027, filed Mar. 15, 2007.

STATEMENT REGARDING FEDERALLY SPONSORED RESEARCH OR DEVELOPMENT

This inventive subject matter was made with Government support under DAAH100320007 awarded by the US Army Aviation Applied Technology Directorate. The Government has certain rights in this inventive subject matter.

TECHNICAL FIELD

The inventive subject matter relates to combustors and, more particularly, to methods of forming fan-shaped effusion holes in combustors.

BACKGROUND

A gas turbine engine may be used to power various types of vehicles and systems. A gas turbine engine may include, for example, four major sections: a compressor section, a combustor section, a turbine section, and an exhaust section. The compressor section raises the pressure of the air to a relatively high level. The compressed air from the compressor then enters the combustor section, where a ring of fuel nozzles injects a steady stream of fuel into a combustion chamber formed by two liners joined by a dome. The combustor dome may be made of a double wall to provide protection from hot gases. The double walled dome typically has an inner surface that may be referred to as a heat shield. After the injected fuel is ignited in the combustor, the energy of the compressed air significantly increases. The high-energy compressed air from the combustor section then flows into and through the turbine section, causing rotationally mounted turbine blades to rotate and generate energy. The air exiting the turbine section is exhausted from the engine via the exhaust section, and the energy remaining in the exhaust air aids the thrust generated by the air flowing through the bypass plenum.

Because combustors are subjected to high temperatures (e.g., temperatures in excess of 2000° C.), they may have limited service lives. In some cases, combustors may have high heat release rates. Thus, the liner, dome, or heat shield surfaces of the combustor may crack, oxidize, or become distorted. To improve the service life of the combustor the temperature of the liner, dome, or heat shield may be lowered.

Effusion cooling can be used to lower liner, dome, or heat shield temperatures. In this regard, a plurality of "effusion holes", which are formed through the combustor liner, direct cooling air from outside of the combustor liner to an inner surface of the combustor liner (e.g., where the combustor liner is exposed to the high temperatures). As a result, the liner is cooled as air flows through each effusion hole and enters the combustor to form an air film to thereby isolate the high temperature gases from the liner. To enhance effusion cooling, the area and shape of effusion holes may be varied from a smaller circular inlet to a larger, fan shaped outlet. Varying the area of the effusion holes may cause the air to diffuse so that its velocity is reduced as the air film forms.

Typically, effusion holes are formed in a combustor liner using percussion-on-the-fly laser machining, whereby a pulsating laser repeatedly strikes the liner until a hole is drilled therethrough. In order to improve manufacturing efficiency, the liner may be continuously rotated so that each laser pulse strikes a different hole during each complete rotation. The hole typically has approximately the same diameter as the laser beam. Thus, forming a hole with an outlet having a shape that differs than that of the laser beam may significantly increase drilling time, as many additional laser strikes may be employed to form a single appropriately shaped outlet. Additionally, because a combustor liner may include thousands of effusion holes, the manufacturing costs of drilling fan-shaped holes using percussion techniques may be prohibitively high.

Hence, it is desirable to have an improved method for forming fan-shaped effusion holes on a combustor liner to decrease manufacturing time.

BRIEF SUMMARY

The inventive subject matter provides methods of forming a plurality of effusion holes on a combustor having a surface, where the effusion holes each have an outlet on the combustor surface, and each outlet has a fan shape.

In an embodiment, and by way of example only, the method includes rotating the combustor relative to a laser beam, and positioning the combustor to a first position where the laser beam is at a first predetermined angle relative to the combustor surface. The laser beam is pulsed at the combustor surface to form a first plurality of trepan cuts. The first predetermined angle is adjusted to a second position where the laser beam is at a second predetermined angle relative to the combustor surface. The laser beam is pulsed at each trepan cut of the first plurality of trepan cuts, to thereby form a cut for at least a portion of the fan shape of each effusion hole outlet, wherein each cut overlaps a trepan cut of the first plurality of trepan cuts.

In another embodiment, and by way of example only, the method includes positioning the laser beam at a first predetermined angle relative to the combustor surface. The laser beam is pulsed at the combustor surface while rotating the combustor relative to the laser beam to form a first plurality of trepan cuts in the combustor. The positioning of the laser beam is adjusted from the first predetermined angle to a second predetermined angle relative to the combustor surface. The laser beam is pulsed at each trepan cut of the first plurality of trepan cuts, after the step of adjusting. The steps of pulsing the laser beam at the combustor surface, adjusting, and pulsing the laser beam at each trepan cut, are repeated until a first row of effusion holes is formed in the combustor. The steps of pulsing the laser beam at the combustor surface, adjusting, and pulsing the laser beam at each trepan cut, are repeated until a second row of effusion holes is formed in the combustor.

Other independent features and advantages of the preferred methods will become apparent from the following detailed description, taken in conjunction with the accompanying drawings which illustrate, by way of example, the principles of the inventive subject matter.

DETAILED DESCRIPTION

The following detailed description of the inventive subject matter is merely exemplary in nature and is not intended to limit the inventive subject matter or the application and uses of the inventive subject matter. Furthermore, there is no intention to be bound by any theory presented in the preceding background or the following detailed description.

Figure 1:
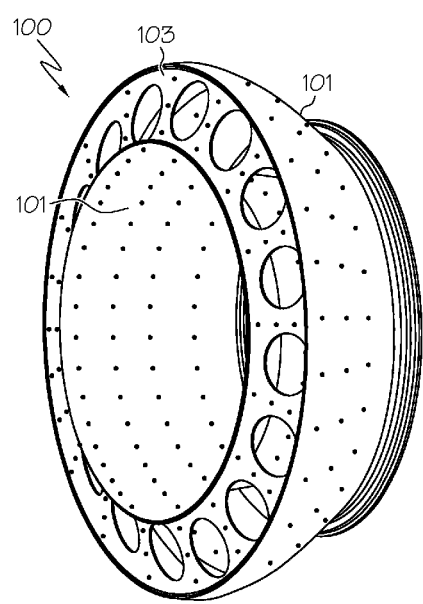
FIG. 1 is a perspective view of a combustor, according to an embodiment.
Figure 2:
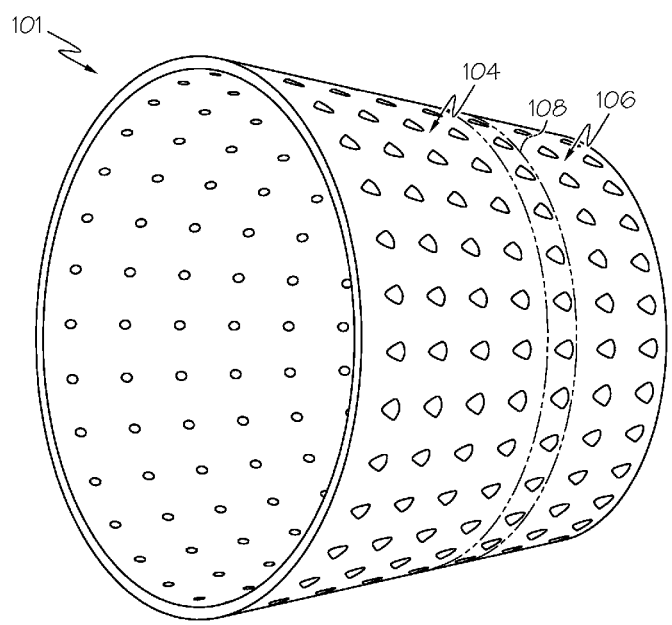
FIG. 2 is a perspective view of a combustor liner, according to an embodiment.

Turning now to FIG. 1, a perspective view of a combustor 100 is provided, according to an embodiment. The combustor 100 is generally formed from one or more cylindrical or conical combustor liners 101 attached to a dome 103. Although shown in this embodiment as being single-walled, the combustor liner may be double-walled in other embodiments. An inner wall of the combustor liner 101, as shown in FIG. 2 and includes a first surface 102, a second surface 104, and a plurality of effusion holes 106. The effusion holes 106 may be disposed in a plurality of rows 108 that may be circumferentially and/or axially formed in the combustor liner 101. The effusion holes 106 may or may not be evenly spaced around the circumference or length of the combustor 100. As indicated in FIG. 1, the effusion holes 106 may also be formed in the dome 103 or the dome's heat shield.

Figure 3:
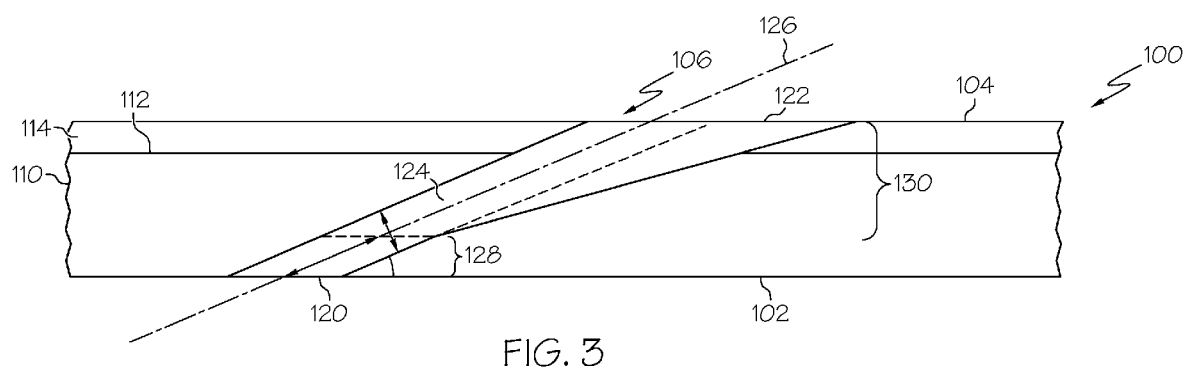
FIG. 3 is a cross-sectional view of a portion of the combustor including an effusion hole, according to an embodiment.

FIG. 3 is a cross-sectional view of a portion of the combustor 100 (e.g., the liner 101, dome 103, or heat shield) including an effusion hole 106, according to an embodiment. The combustor 100 may be made up of a substrate 110 having one or more layers 112, 114 thereon. For example, one layer 114 may be a thermal barrier coating made of conventional inner layer compositions such as yttria-stabilized zirconia, while the other layer 112 may be an intermediate layer used to bond the inner layer 114 to the substrate 110. The intermediate layer may be graded or may be an adhesive, in some embodiments.

The effusion hole 106 extends between the first and second surfaces 102, 104 of the combustor 100 and includes an inlet 120 and an outlet 122 formed thereon, respectively. In an embodiment such as where the portion of the combustor is the liner, the first surface 102 may be an inner surface of the liner, and the second surface 104 may be an outer surface. However, in alternatively embodiments, the first surface 102 may be an outer surface, while the second surface 104 may be an inner surface.

Figure 4:
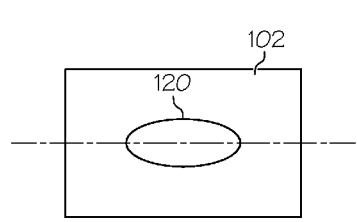
FIG. 4 is a perspective view of a portion of an inner surface of the combustor including the effusion hole, according to an embodiment.
Figure 5:
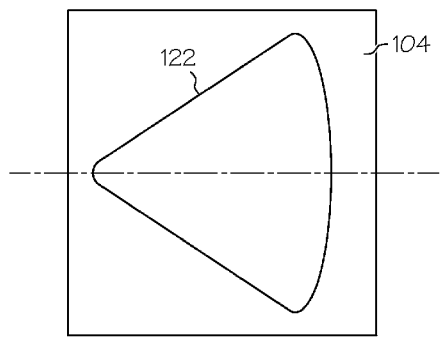
FIG. 5 is a perspective view of a portion of an inner surface of the combustor including the effusion hole, according to an embodiment.

FIG. 4 is a perspective view of a portion of the combustor 100 including the inlet 120, according to an embodiment. As shown therein, the inlet 120 of the effusion hole 106 may have a circular shape. The outlet 122 may have a fan-shape. An embodiment of a suitable fan shaped outlet 122 is shown in perspective view in FIG. 5. Although shown as relatively V-shaped in FIG. 5, the fan-shape may be U-shaped, ovular, elliptical, quadrilateral, or other shapes suitable for placing air onto the second surface 104 of the combustor 100.

Referring again to FIG. 3, a channel 124 provides communication between the inlet 120 and outlet 122 and is formed such that if a centerline 126 is extended therebetween, the centerline 126 is angled relative to the combustor second surface 104. In an embodiment, the angle between the centerline 126 and the combustor second surface 104 may be between about 15 and about 30 degrees. Additionally, in an embodiment, as shown in FIG. 3, the channel 124 may have more than one section, where each section has a different cross-sectional shape. For example, in FIG. 3, the cross-sectional shape of a first section 128 may be constant and may be circular, while the cross sectional shape of a second section 130 may vary from the first section (circular) to the outlet 122 (fan-shaped). It will be appreciated that the effusion holes 106 may or may not all have substantially the same shape. For example, a first set of effusion holes may have a first shape and the channel 124 may be angled at an angle relative to the combustor second surface 104, while a second set of effusion holes may have the same shape or a different shape and the channel 124 may be angled at a different angle relative to the combustor second surface 104.

Figure 6:
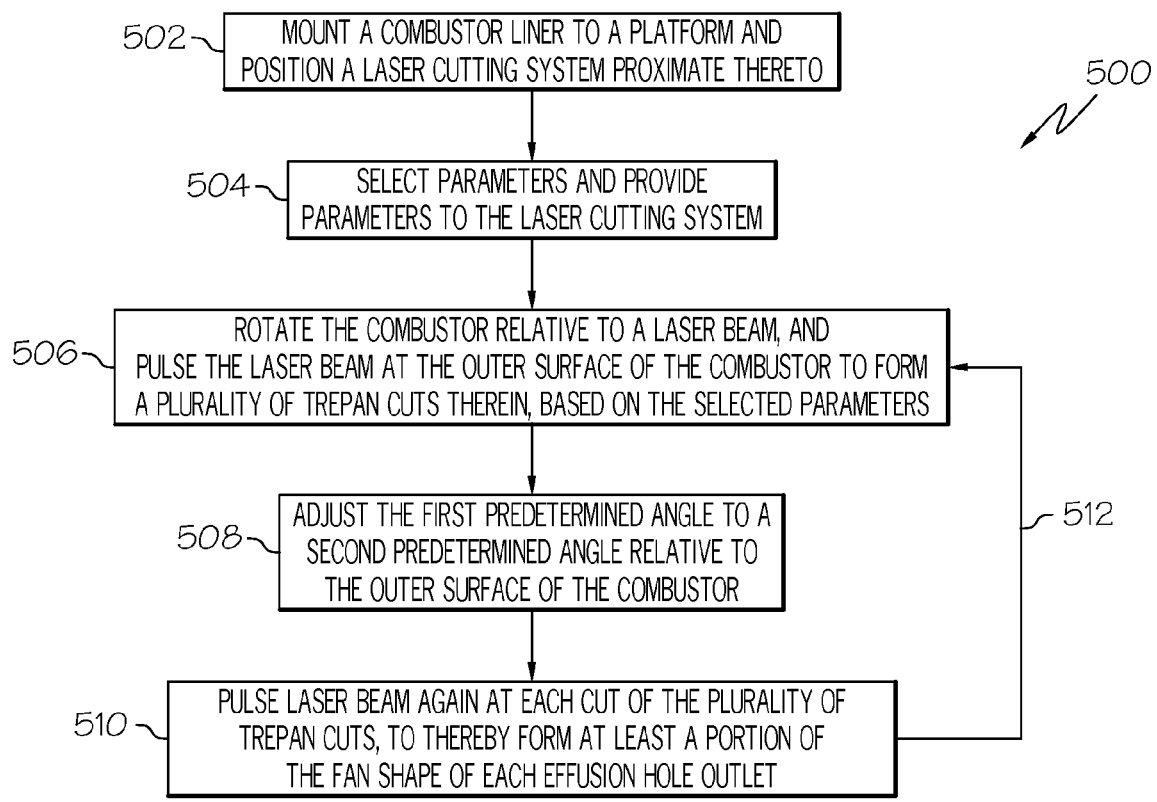
FIG. 6 is a flow diagram of a method of forming the effusion holes, according to an embodiment.

Referring now to FIG. 6, a flow diagram of a method 500 for forming the fan-shaped effusion holes 106 is shown. The method 500 includes mounting the combustor to a platform and positioning the combustor relative to a laser cutting system proximate thereto, step 502. Next, parameters are selected and provided to the laser cutting system, step 504. The combustor is rotated relative to a laser beam from the laser cutting system, and the laser beam, which is disposed at a first predetermined angle relative to the inner surface of the combustor, is pulsed at a surface of the combustor to form a first plurality of spaced trepan cuts therein, based on the selected parameters, step 506. Then, the first predetermined angle is adjusted to a second predetermined angle relative to the inner surface of the combustor by positioning and rotating the combustor relative to the laser beam, step 508. The laser beam is then pulsed again to create a second plurality of spaced trepan cuts, to thereby form at least a portion of the fan shape of each effusion hole outlet, during relative motion between the combustor and laser beam, step 510. Each of these steps will now be described in more detail.

Figure 7:
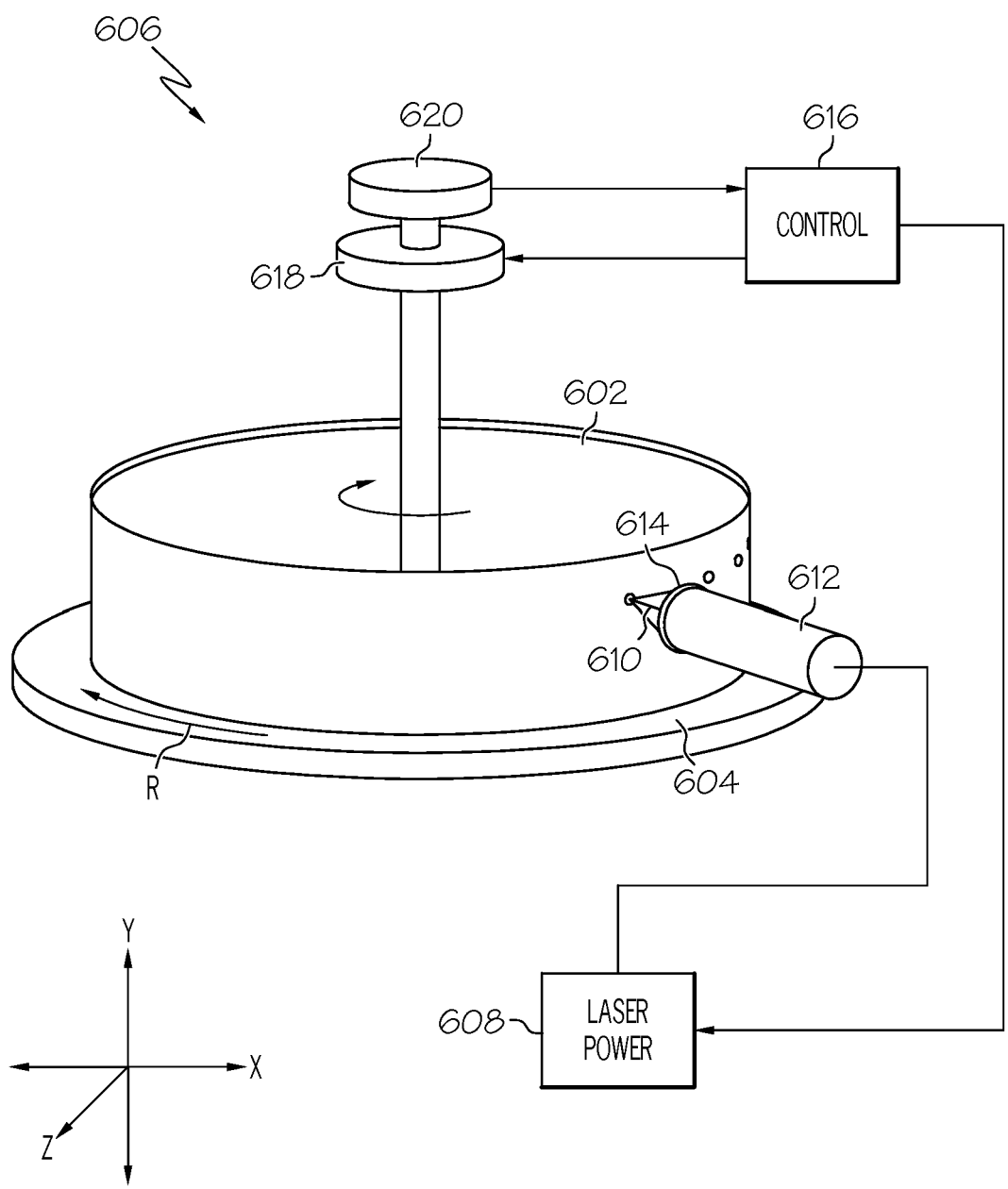
FIG. 7 is a simplified schematic of a set up that may be used to form the effusion holes, according to an embodiment.

As mentioned above, a set up is provided in which the combustor is mounted to a platform and positioned proximate a laser cutting system, step 502. An embodiment of the aforementioned set up is depicted in FIG. 7. Here, the platform is a rotating table 604 configured to rotate about an axis and the combustor 602 (e.g., the liner or the dome) is disposed on a table 604. In an embodiment, the table 604 may be further configured to tilt and move up, down, left, and right to thereby position the combustor 602 relative to the laser cutting system 606. The laser cutting system 606 includes a laser power supply 608 that is configured to pulse a laser beam 610 of laser energy through a lens 612 when a shutter 614 is open. Each component of the system 606 may be controlled by a controller 616. The controller 616 may be adapted to position the laser lens 612 relative to the combustor 602, based on feedback that may be received from a position sensor 618. In an embodiment, a drive 620 may be included to coordinate the rotation of the table 604 with the positioning of the laser beam 610. In an alternate embodiment, the laser lens 612 may be movable to provide various relative positions between the combustor 602 and the laser lens 612.

Next, parameters are selected and provided to the laser cutting system 606, step 504. The parameters may include an angle at which the laser beam 610 will cut the combustor 602 relative to its surface, the size and number of the holes to be cut, hole positions, and the like. In an embodiment, the controller 616 may be configured to provide commands to the table 604 to adjust its positioning to allow the laser beam 610 to be aimed at the combustor 602 at a predetermined angle. The predetermined angle, as suggested above, may be an angle that is substantially parallel with a desired centerline 126 of an effusion hole 106, or any other suitable angle relative to the surface of the combustor 602. In an embodiment, the centerline 126 may be angled at an angle that is less than 90 degrees relative to the surface of the combustor 602. In another embodiment, the centerline 126 may be angled at an angle that is between about 15 and about 30 degrees. The controller 616 may be configured to provide commands to a non-illustrated actuator to reposition the laser lens 612, such that it can supply the laser beam 610 at the predetermined angle.

The desired size of the holes can be selected and corresponding instructions may be provided to the laser cutting system 606. In an embodiment, the holes 106 may each have a diameter of between about 0.4 mm and 1.0 mm, and the controller 616 may use the selected parameters to calculate the number of cuts required to form a hole 106. It will be appreciated that the particular number of cuts employed to form a single hole may depend on the selected size of the hole 106, and the intensity of the laser beam 610.

Figure 8:
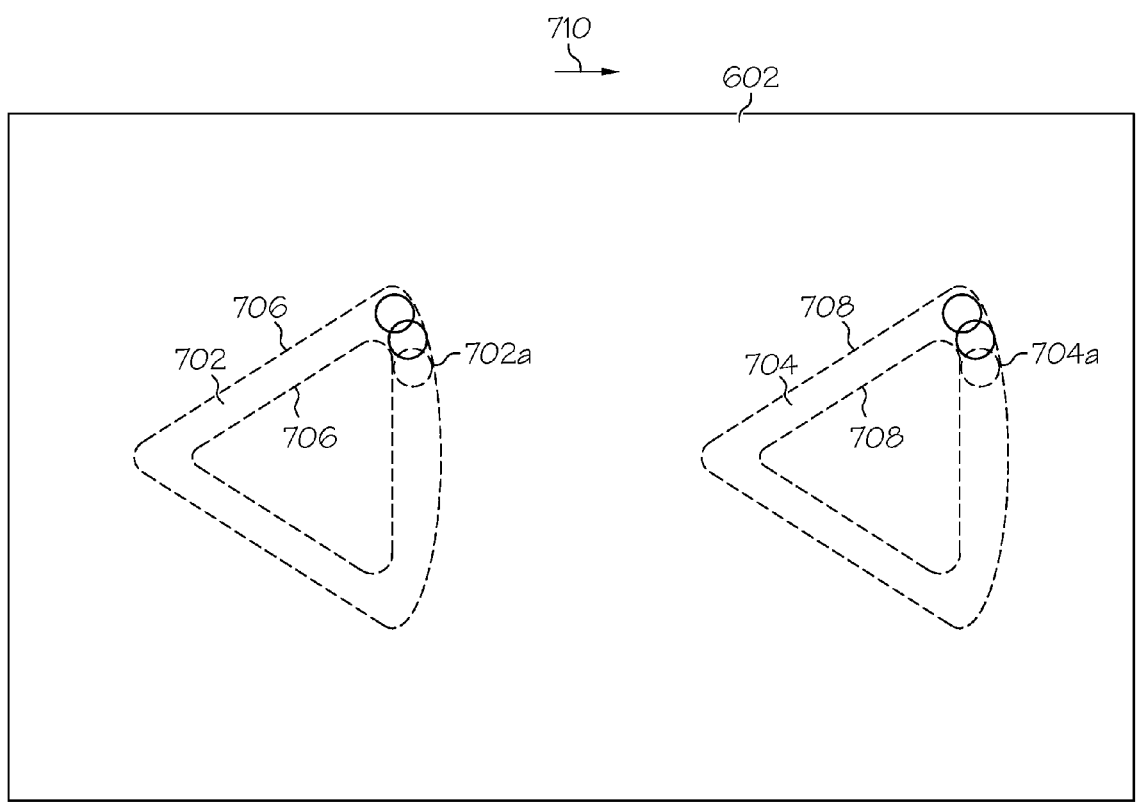
FIG. 8 is an enlarged perspective view of a portion of the combustor after a portion of two effusion holes have been formed, according to an embodiment.

The controller 616 may also use the selected parameters to determine a path along which the laser beam 610 may travel in order to form the holes 106. Turning now to FIG. 8, an enlarged perspective view is illustrated of a portion of the combustor 602 after portions of two effusion holes 702, 704 have been formed through a surface of the combustor 602, according to an embodiment. Here, dashed lines 706, 708 indicate paths that the laser lens 612 may trace on the combustor 602 as the table 604 is moved by controller 616. An arrow 710 shows the direction of rotation of the combustor 602. In an embodiment, the controller 616 may be configured to calculate the coordinates of each position on the paths 706, 708. In some cases, such as in cases in which the holes are fan-shaped and angled relative to the surface of the combustor 602, the controller 616 may calculate each position on the path by determining x, y, and z tilt and rotation coordinates.

After the selected parameters are inputted into the laser cutting system 606, the combustor 602 is disposed at a first predetermined angle, and the laser beam 610 is pulsed to form a first plurality of spaced trepan cuts, step 506. As used herein, a trepan cut may be defined as a cut through a surface in which a hole will be made, where the cut is made around a periphery of what will result in the hole. In an embodiment, step 506 is performed while the combustor 602 is rotating relative to the laser beam 610. For example, as shown in FIG. 8, a trepan cut 702a from a laser beam 610 may form a portion of the periphery of hole 702. Next, the combustor 602 may be rotated to another position and the laser beam 610 pulsed again to form a trepan cut 704a for an adjacent hole 704. In an embodiment of a cutting sequence, the duration of the laser pulse may be relatively short (typically about 0.5 milliseconds), and the table 604 can be rotated at a constant speed in the rotational direction without stopping the table 604 for each pulse. In this regard, the laser beam 610 may be used to form a first series of cuts. The cuts may be formed as a row. In an embodiment, the laser lens 612 can fire evenly timed pulses creating a series of evenly spaced trepan cuts 702a, 704a around the combustor 602 to consequently form a row of evenly spaced holes 106.

The combustor 602 may be thick walled (e.g., may have a liner or dome wall thickness of more than 2.5 mm); thus, more than one laser pulse may be used to form a single cut through the thickness of the combustor 602. In an example, a first pulse of the laser beam 610 may be used to form a trepan cut through a portion of the combustor 602 during the first rotation of the table 604, then a second pulse of the laser beam 610 may trepan cut through another portion of the combustor 602 during a second rotation, and so on, until the trepan cut is completely formed through the thickness of the 602. In an embodiment in which "mapping" occurs, the position sensor 618 may sense data related to a position of the combustion 602 prior to drilling, record the combustor position data, and use the recorded data to position the 602 in a desired location prior to each pulse of the laser beam 610. In an alternative embodiment in which "following" occurs, the position sensor 618 may sense that the combustor 602 is in a desired location prior to each pulse of the laser beam 610. The pulse rate of the laser power supply 608 may be maintained in timing relative to the rotation of the table 604, and an angle at which the laser beam 610 is aimed may be maintained as well. Thus, as the combustor 602 continues to rotate, the laser lens 612 follows the predetermined paths 706, 708 to cut the holes 702, 704 at appropriate locations.

After the combustor 602 completes at least one rotation, e.g. 360°, the combustor 602 is adjusted from the first predetermined angle to a second predetermined angle relative to the laser beam 610, step 508. In an embodiment, the adjustment may be made after the first row of trepan cuts is formed. The laser beam 610 may be pulsed to make a second series of a second plurality of trepan cuts and thereby form a portion of the fan shape of each effusion hole outlet 122, step 510. The first row of trepan cuts and the second series may overlap to each form a cut defined in part by a single contiguous and substantially smooth surface. Steps 506, 508, and 510 are then repeated (step 512) until the formation of each hole in the row is completed, such that each hole has the fan-shaped outlet 122 and, in some embodiments, the circular-shaped inlet 120.

In another embodiment, steps 506, 508, and 510 of the method 500 may be repeated (step 512) to form a second row of effusion holes 106 on the combustor 602. As briefly mentioned above, the first row of effusion holes 106 may have a first shape and the channel 124 may be angled at an angle relative to the combustor surface, while a second row of effusion holes may have the same shape or a different shape and the channel 124 may be angled at a different angle relative to the combustor surface. In such case, the selected parameters of the specific angles and shapes of the effusion holes of the second row may be inputted into the laser cutting system 602 during the initial parameter selection step of step 504.

After the effusion holes 106 are formed, then the control sequence ends and the table 604 may be shut off. Accordingly, the completed combustor 602 can be removed and implemented into an engine.

Improved methods have now been provided for forming fan-shaped effusion holes on a combustor, such as the combustor liner, dome, or dome heat shield using trepanning on-the-fly techniques as described above. The methods may be used to form a plurality of the effusion holes on the combustor liner, where each of the effusion holes has an outlet on the combustor surface and an outlet having a fan shape. The trepanning on-the-fly technique includes a laser beam making a series of contiguous cuts along the periphery of a hole during continuous relative motion between the combustor and laser beam. For example, the method may include the steps of rotating the combustor on a table, positioning the liner relative to the laser beam, pulsing the laser beam to create a series of spaced trepan cuts along a portion of the periphery of the holes during relative movement between the liner and the laser beam, rotating the liner on the table, positioning the liner to another position, pulsing the laser beam, and creating a second series of spaced trepan cuts along a portion of the periphery of the holes during relative movement between the combustor and the pulsed laser, where the second series overlapping the first series to form cuts making up a portion of the fan shaped holes.

While the inventive subject matter has been described with reference to a preferred embodiment, it will be understood by those skilled in the art that various changes may be made and equivalents may be substituted for elements thereof without departing from the scope of the inventive subject matter. In addition, many modifications may be made to adapt to a particular situation or material to the teachings of the inventive subject matter without departing from the essential scope thereof. Therefore, it is intended that the inventive subject matter not be limited to the particular embodiment disclosed as the best mode contemplated for carrying out this inventive subject matter, but that the inventive subject matter will include all embodiments falling within the scope of the appended claims.

We claim:

1. A method of forming a plurality of effusion holes on a combustor having a surface, the effusion holes each having an outlet on the combustor surface, the method comprising the steps of:
   rotating the combustor relative to a laser beam, and positioning the combustor to a first position where the laser beam is at a first predetermined angle relative to the combustor surface;
   pulsing the laser beam at the combustor surface to form a first plurality of trepan cuts;
   adjusting the first predetermined angle to a second position where the laser beam is at a second predetermined angle relative to the combustor surface;
   pulsing the laser beam at each trepan cut of the first plurality of trepan cuts, to thereby form a cut for at least a portion of each effusion hole outlet, wherein each cut overlaps a trepan cut of the first plurality of trepan cuts; and
   repeating the steps of rotating, pulsing the laser beam at the combustor surface, adjusting, and pulsing the laser beam at each trepan cut to so that each effusion hole has an outlet having a fan shape.

2. The method of claim 1, wherein:
   the step of rotating comprises rotating the combustor at least one rotation; and
   the step of adjusting comprises adjusting the first predetermined angle to the second predetermined angle after the combustor rotates at least one rotation.

3. The method of claim 1, wherein:
   the step of pulsing the laser beam at the combustor surface to form a first plurality of trepan cuts therein comprises disposing the laser beam at an angle of between about 15 and about 30 degrees relative to the combustor surface.

4. The method of claim 1, wherein:
   the step of pulsing a laser beam at the combustor surface to form a first plurality of trepan cuts therein, comprises pulsing a laser beam at the combustor surface to form a first row including the first plurality of trepan cuts.

5. The method of claim 4, further comprising:
   adjusting the position of the laser beam from the second predetermined angle to a third predetermined angle relative to the combustor surface; and
   pulsing the laser beam at the combustor surface to form a second plurality of trepan cuts therein to form a second row of cuts.

6. The method of claim 1, wherein the step of pulsing the laser beam at each trepan cut of the first plurality of trepan cuts comprises forming the first plurality of trepan cuts such that each cut is formed through a portion of a thickness of the combustor.

7. The method of claim 6, wherein the step of pulsing the laser beam at each trepan cut of the first plurality of trepan cuts comprises forming the first plurality of trepan cuts such that each cut is formed through the thickness of the combustor.

8. The method of claim 1, wherein each step of the method is repeated until each effusion hole includes a circular inlet.

9. The method of claim 1, wherein the combustor surface comprises a combustor dome surface or heat shield.

10. The method of claim 1, wherein the combustor surface comprises a combustor liner surface.

11. A method of forming a plurality of effusion holes on a combustor having a surface, the effusion holes each having an outlet on the combustor surface, the method comprising the steps of:
    positioning the laser beam at a first predetermined angle relative to the combustor surface;
    pulsing the laser beam at the combustor surface while rotating the combustor relative to the laser beam to form a first plurality of trepan cuts in the combustor;
    adjusting the positioning of the laser beam from the first predetermined angle to a second predetermined angle relative to the combustor surface;
    pulsing the laser beam at each trepan cut of the first plurality of trepan cuts, after the step of adjusting;
    repeating the steps of pulsing the laser beam at the combustor surface, adjusting, and pulsing the laser beam at each trepan cut, until a first row of effusion holes is formed in the combustor, wherein each effusion hole in the first row of effusion holes has an outlet having a fan-shape; and
    repeating the steps of pulsing the laser beam at the combustor surface, adjusting, and pulsing the laser beam at each trepan cut, until a second row of effusion holes is formed in the combustor.

12. The method of claim 11, wherein:
    the step of adjusting comprises adjusting the first predetermined angle to the second predetermined angle after the combustor rotates at least one rotation.

13. The method of claim 11, wherein:
    the step of adjusting comprises disposing the laser beam at an angle of between about 15 and about 30 degrees relative to the combustor surface.

14. The method of claim 11, wherein the step of pulsing the laser beam at each trepan cut of the first plurality of trepan cuts comprises forming the first plurality of trepan cuts such that each trepan cut is formed through a portion of a thickness of the combustor.

15. The method of claim 11, wherein the step of pulsing the laser beam at each trepan cut of the first plurality of trepan cuts comprises forming the first plurality of trepan cuts such that each trepan cut is formed through the thickness of the combustor.

16. The method of claim 11, wherein each step of the method is repeated until each effusion hole includes a circular inlet and the fan-shaped outlet.

17. The method of claim 11, further comprising:
    adjusting the second predetermined angle to a third predetermined angle relative to the combustor surface, before the step of repeating the steps of pulsing the laser beam at the combustor surface, adjusting, and pulsing the laser beam at each trepan cut, until a second row of effusion holes is formed in the combustor.

18. The method of claim 11, wherein the combustor surface comprises a combustor dome surface or heat shield.

19. The method of claim 11, wherein the combustor surface comprises a combustor liner surface.

* * * * *